United States Patent [19]

Kronbauer et al.

[11] Patent Number: 5,210,556
[45] Date of Patent: May 11, 1993

[54] SLIDE MAGAZINE

[75] Inventors: Hermann Kronbauer, Aschheim; Christian Rehm, Munich, both of Fed. Rep. of Germany

[73] Assignee: reflecta GmbH foto film projektion, Schwabach, Fed. Rep. of Germany

[21] Appl. No.: 922,852

[22] Filed: Jul. 31, 1992

[30] Foreign Application Priority Data

Aug. 22, 1991 [EP] European Pat. Off. ........ 91114039.0

[51] Int. Cl.$^5$ ............................................. G03B 23/02
[52] U.S. Cl. ................................... 353/120; 353/116; 353/114; 206/456
[58] Field of Search ......... 353/120, 114, 116, DIG. 5, 353/118; 206/449, 455, 456

[56] References Cited

U.S. PATENT DOCUMENTS

| | | | |
|---|---|---|---|
| 2,931,116 | 3/1988 | Boughton et al. | 353/116 |
| 3,416,250 | 12/1968 | Schweers | 206/456 |
| 3,468,603 | 9/1969 | Kovarik | 353/116 |
| 3,532,421 | 10/1970 | Schlessel | 353/116 |
| 3,830,566 | 8/1974 | Bennett | 353/116 |
| 4,379,627 | 4/1983 | Nael | 353/120 |

FOREIGN PATENT DOCUMENTS

| | | |
|---|---|---|
| 1901091 | 8/1970 | Fed. Rep. of Germany . |
| 1524772 | 5/1968 | France . |
| 2094498 | 9/1982 | United Kingdom . |

Primary Examiner—William A. Cuchlinski, Jr.
Assistant Examiner—William C. Dowling
Attorney, Agent, or Firm—Bachman & LaPointe

[57] ABSTRACT

A slide magazine has a base portion and partitioning walls which project upwardly away from the base portion at mutual spacings to form compartments for accommodating respective slide frames. The partitioning walls are of a height which is adapted to the slide frames and at their ends remote from the base portion are connected together by a strip-shaped holding portion extending over the length of the slide magazine so each compartment can be loaded and unloaded from both sides. To prevent the slide frame in a compartment from falling out laterally, provided at each side of each compartment is at least one resilient retaining portion in the form of a resilient finger with a retaining nose arranged to engage the slide frame.

6 Claims, 2 Drawing Sheets

SLIDE MAGAZINE

BACKGROUND OF THE INVENTION

A form of slide magazine for holding a number of slides or transparencies comprises a base portion and partitioning walls which project upwardly from the base portion at spacings from each other, thereby to form compartments for accommodating respective slide frames. However the design configuration of such a slide magazine is such that it is only suitable for slide frames to be withdrawn therefrom at one side thereof because the partitioning walls which define the individual compartments for the slide frames are connected together on one longitudinal side of the slide magazine by means of a side wall which extends upwardly from the base portion of the slide magazine. The height of the side wall is only immaterially lower than the height of each partitioning wall above the base portion. Furthermore, the individual partitioning walls are at such a spacing from each other that the slide magazine is suitable for slide frames of standardised thickness. That means that the slide magazine suffers from the serious disadvantage that slide frames cannot be disposed therein in a spill-free manner and thus can relatively easily fall out.

SUMMARY OF THE INVENTION

An object of the present invention is to provide a slide magazine which is suitable for accommodating normal slide frames of standardised thickness in at least substantially spill-free manner therein.

Another object of the present invention is to provide a slide magazine so designed that slide frames which are disposed therein in a spill-free manner can nonetheless be relatively easily removed therefrom.

Still another object of the present invention is to provide a magazine for accommodating a plurality of slides, such that the slide frames are prevented from accidentally falling out of the magazine but can be comparatively easily removed therefrom when that is specifically required.

In accordance with the present invention, the foregoing and other objects are attained by a slide magazine comprising a base portion and a plurality of partitioning walls which project upwardly away from the base portion at spacings from each other to form compartments for receiving respective slide frames. The partitioning walls are of a height which is at least substantially adapted to the slide frames and at their ends remote from the base portion are connected together by a strip-shaped holding portion extending over the length of the slide magazine, for securing a slide frame disposed in a respective compartment to prevent it from falling out. Each compartment can be loaded with or emptied of a slide frame from both sides thereof while at least one resilient retaining portion is provided at each side of each compartment for securing the slide frame therein to prevent it from falling out sideways.

In such an arrangement, the appropriate resilient retaining portion may be disposed at the partitioning wall which defines the corresponding compartment, that is to say on the two side edges thereof.

In accordance with a preferred feature of the invention, resilient fingers are provided at the two mutually remote end portions of the bottom part of each compartment on the base portion, to form the retaining portions for securing the respective slide frame. The fingers project laterally in opposite directions and at their mutually remote ends are provided with upwardly projecting retaining noses for holding a corresponding slide frame in position. The two holding noses of a compartment are preferably disposed at a spacing from each other which corresponds to the length of an edge of a slide frame of square peripheral configuration. That arrangement provides that the slide magazine is simple to manufacture.

By virtue of the resilient fingers being of a suitable configuration, it is possible to ensure appropriate resiliency characteristics such as to provide that a slide frame is securely held in a compartment of the slide magazine, between the resilient retaining portions or the retaining noses which project upwardly from the resilient fingers, and the strip-shaped holding portion disposed at the top side of the slide magazine, even after the slide magazine has been in use over a prolonged period of time. On the one hand, fingers of that kind can be produced relatively easily while on the other hand that configuration provides a sufficiently high spring force to ensure that the slide frame disposed in a compartment is pressed against the upper strip-shaped holding portion by means of the resilient fingers or the retaining projections disposed thereon, with a force such that the corresponding slide frame is satisfactorily prevented from unintentionally falling out of the slide magazine. However, the slide frame can be readily removed from the slide magazine by a suitable force being applied to the corresponding slide frame, as is produced by the gripping and withdrawal device forming part of a slide projector in which the slides are to be projected. By virtue of its base portion being of a suitable design the slide magazine according to the invention is suited to use in conventional slide projectors in which the slide frames are taken out of the slide magazine only at one side, but the slide magazine in accordance with the invention is also intended more particularly for use in conjunction with a new design of slide projector which has two gripping and withdrawal devices so that slide frames can be removed from the slide magazine and returned to the slide magazine again from both one side and also the other opposite side of the slide magazine. Such a projector is more particularly a slide projector using a blending and mixing operating procedure.

It is advantageous for the slide magazine to be of a symmetrical configuration in order to minimise the risk of production wastage as a result of uneven or irregular shaping or setting of the plastic material from which such a slide magazine is generally made. For that purpose, in accordance with a preferred feature of the invention, the strip-shaped holding portion at the top side of the slide magazine extends at least substantially centrally in the longitudinal direction of the slide magazine and, in the transverse direction of the slide magazine, is of a width which is small in comparison with the transverse dimension of the slide magazine. Such dimensioning makes it readily possible for the strip-shaped holding portion to be produced by means of suitable sliding mold inserts in the slide magazine molding tool, with such inserts leaving a suitable opening free in the base portion of the slide magazine or the bottom of each compartment. It will be appreciated that such openings in the bottom of each compartment not only provide for a saving of material, but at the same time also give a reduction in the weight of the slide magazine. The same purpose can be achieved if, in accordance with another preferred feature of the invention, in the vicinity of the base portion of the slide magazine, each partitioning wall is of a transverse dimension which corresponds to that of the base portion and then tapers or decreases upwardly towards the stripshaped holding portion at the top side of the slide magazine. That configuration provides generally a slide magazine which is of a stable shape and which can be loaded and emptied from both sides and in which the slide frames carried by the slide magazine remain readily accessible.

Further objects, features and advantages of the present invention will be apparent from the following description of a preferred embodiment.

DESCRIPTION OF THE PREFERRED EMBODIMENT

Figure 1:
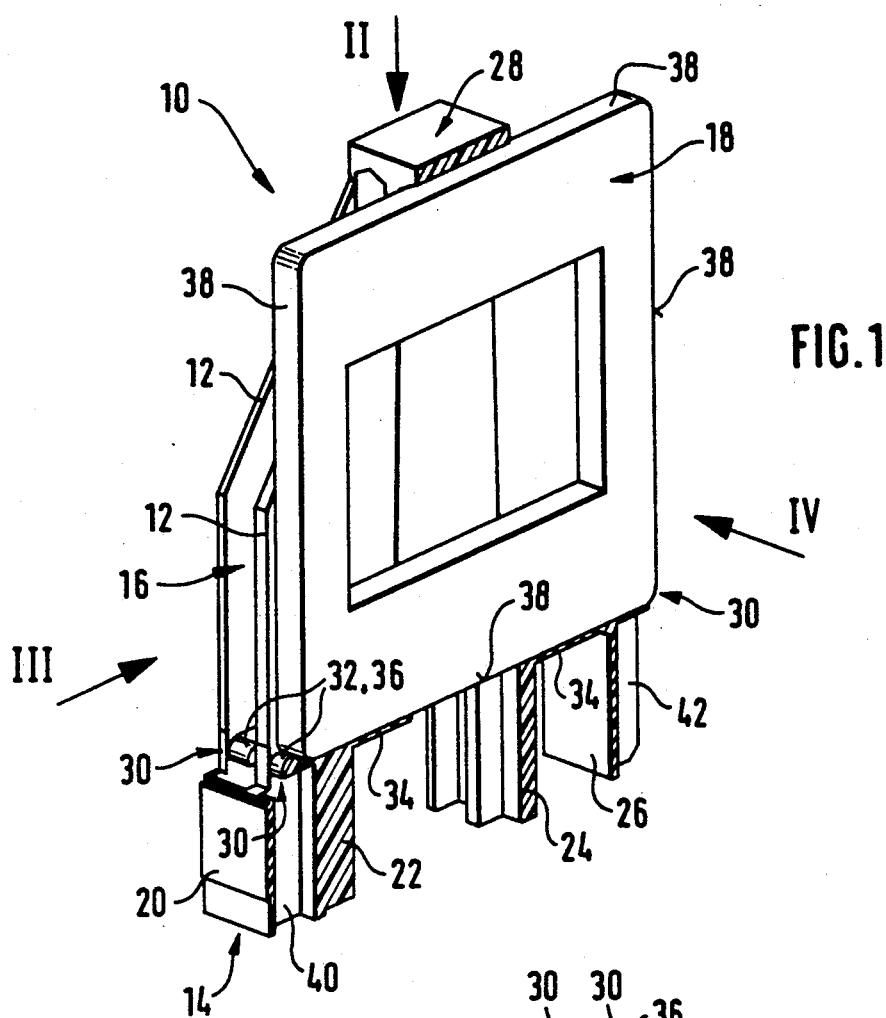
FIG. 1 is a perspective view of an end part of a slide magazine in accordance with the invention, showing one compartment thereof in its entirety but without a slide frame therein and showing the adjacent compartment in section with one of its partitioning walls removed but with a slide frame therein.
Figure 2:
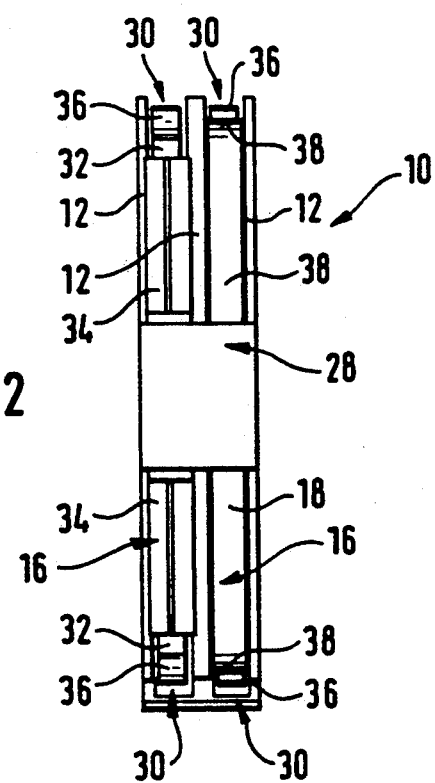
FIG. 2 is a plan view of the part of the slide magazine shown in FIG. 1, viewing in the direction indicated by the arrow II therein.
Figure 3:
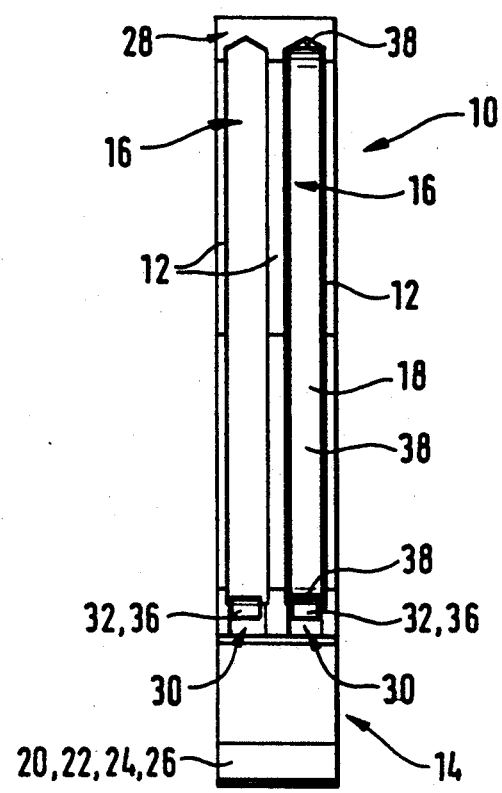
FIG. 3 is a view of the part of the slide magazine shown in FIG. 1 viewing from the side in the direction indicated by the arrow III in FIG. 1.

Referring generally to the drawings in which the same reference numerals are used throughout FIGS. 1 through 4 to denote the same features, shown therein is an end part of a slide magazine 10 which is of an elongate configuration, being elongated in the general direction of the arrow indicated by IV in FIG. 1. The slide magazine 10 has a plurality of partitioning walls 12 which are disposed at spacings from each other in the longitudinal direction of the slide magazine and which project upwardly from a base portion 14 of the slide magazine 10. A respective compartment 16 is thus defined between each two adjacent partitioning walls 12, for receiving and holding a respective slide frame 18.

The base portion 14 has longitudinally extending elements 20, 22, 24 and 26, the longitudinal element 24 being in the form of a toothed bar or rack to provide for the drive for the slide magazine 10.

The partitioning walls 12 are disposed at such a spacing from each other that the slide magazine 10 is suitable for receiving any conventional slide frame 18 of standardised thickness.

Reference will be made at this point more especially to FIG. 4 which shows that the partitioning walls 12 are of a height which is adapted to the length of the edges of the square slide frame 18. At their free ends which are thus remote from the base portion 14, the partitioning walls 12 are connected together by a strip-shaped holding portion 28 which extends over the length of the slide magazine 10. The slide frames 18 disposed in the respective compartments 16 are prevented from falling out of the slide magazine in a direction which corresponds to the upward direction in the drawings, by virtue of the presence of the strip-shaped holding portion 28.

Figure 4:
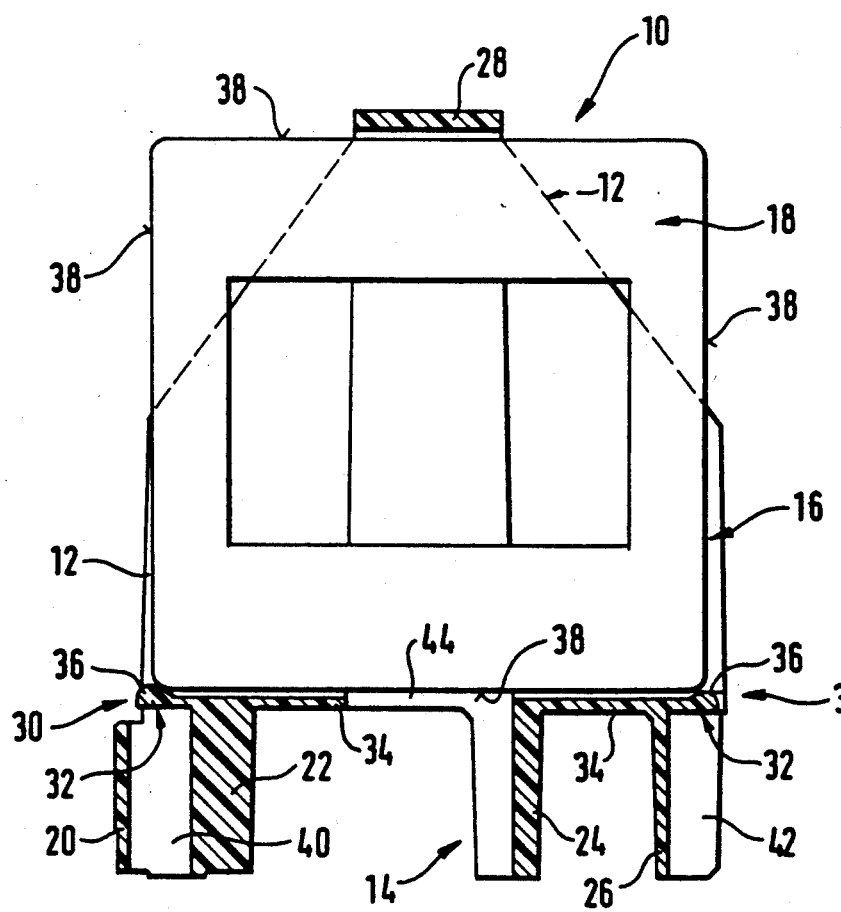
FIG. 4 is a view of the sectioned end part of the slide magazine shown in FIG. 1 viewing from the front in the direction indicated by the arrow IV in FIG. 1.

It will also be apparent from FIG. 4 that the slide magazine 10 can be loaded with slide frames 18 from both sides of the slide magazine 10 and similarly slide frames 18 can be removed from the slide magazine 10 at both sides thereof. To prevent each slide frame 18 from accidentally falling out of its corresponding compartment 16 sideways, at least one resilient retaining portion 30 is provided at each side of each compartment 16.

In the slide magazine 10 shown in the drawings, the resilient retaining portions 30 are formed by resilient fingers 32 which are disposed at the two mutually remote end portions of the bottom 34 of each compartment 16 and which project laterally away therefrom in mutually opposite directions. At their ends which are away from each other and on their top sides, the resilient fingers 32 have retaining noses 36 for holding a corresponding slide frame 18 in the respective compartment 16. The two retaining noses 36 of each compartment 16 are at a spacing from each other which at least substantially corresponds to the length of the edge as indicated at 38 of the square slide frame 18.

For the purpose of molding the resilient fingers 32 with the retaining noses 36 thereon, the slide magazine 10 has openings 40 produced by suitable slidable mold inserts in the molding tool used for producing the slide magazine 10, between the longitudinal elements 20 and 22 on the base portion 14, while openings 42 are similarly provided laterally beside the longitudinal element 26. In a corresponding fashion, openings 44 which are similarly produced by suitable slidable mold inserts in the molding tool for producing the slide magazine 10 are formed in the bottom 34 of each compartment 16, for the purposes of molding the strip-shaped holding portion 28 at the top edge of the slide magazine 10.

It will also be apparent more especially from FIG. 4 that the resilient fingers 32 are of a short length, in comparison with the transverse dimension of the slide magazine 10. FIGS. 1 and 4 also make it clear that each partitioning wall 12, in the vicinity of the base portion 14, is of a transverse dimension which at least substantially corresponds to the dimension of the base portion 14, while each partitioning wall 12 decreases in width towards the strip-shaped holding portion 28 extending along the top side of the slide magazine 10. It will be seen from FIG. 4 that each partitioning wall 12 is of a configuration in front view which comprises mutually parallel side edges which extend upwardly away from the base portion 14 and then side edge portions which converge in an upward direction, that is to say away from the base portion 14, to meet the strip-shaped holding portion 28.

It will be appreciated that the above-described slide magazine has been set forth solely by way of example and illustration of the principles of the present invention and that various modifications and alterations may be made therein without thereby departing from the spirit and scope of the present invention.

What is claimed is:

1. A slide magazine comprising: a base portion; partitioning walls which project upwardly away from the base portion at spacings from each other to form compartments for receiving respective slide frames, the partitioning walls having ends remote from the base portion at a height which is adapted to the slide frames; a stripshaped holding portion connecting the partitioning walls together at their ends remote from the base portion and extending over the length of the slide magazine, the holding portion being arranged to secure a slide frame in a respective compartment to prevent it from falling out and to permit each compartment to be loaded or unloaded from each side; and at least one resilient retaining portion at each side of each compartment to retain the slide frame therein by preventing it from falling out sideways.

2. A slide magazine as set forth in claim 1 wherein said retaining portions comprise resilient fingers at the mutually remote end portions of the bottom of each compartment, the fingers projecting laterally in opposite directions to free ends thereof and being provided at their free ends with upwardly projecting retaining noses for retaining a respective slide frame.

3. A slide magazine as set forth in claim 1 wherein the holding portion extends at least substantially centrally in this longitudinal direction of the slide magazine and the traverse direction of the holding portion is of a width which is smaller than the width of the slide magazine in its traverse dimension.

4. A slide magazine as set forth in claim 1 wherein in the vicinity of the base portion each partitioning wall is of a transverse dimension which corresponds to the base portion and decreases towards the holding portion.

5. A slide magazine for accommodating a plurality of slide frames, comprising: a base portion; an array of partitioning walls on the base portion at spacings from each other to define a plurality of compartments for receiving respective slide frames, the partitioning walls having free ends disposed at a spacing from the base portion which is adapted to the slide frames; a holding portion which extends over the array of partitioning walls and connects said free ends of the partitioning walls together, thereby to hold the slide frames in the respective compartments by preventing them from falling out in a direction away from the base portion while being adapted to permit respective compartments to be loaded and unloaded from both sides of the slide magazine; and retaining means at each side of each compartment for retaining the respective slide frame therein by preventing it from falling out sidwways in relation to the slide magazine, the retaining means being adapted to resiliently deflect from the operative retaining position to an inoperative position permitting insertion of a slide frame into a respective compartment and release of the slide frame from the compartment in which it is inserted.

6. A slide magazine as set forth in claim 5 wherein the partitioning walls are of a reduced width at least in a region towards their free ends to facilitate slide frames in the respective compartments being engaged in said region for loading and unloading thereof.

* * * * *